United States Patent
Chundrlik, Jr. et al.

(10) Patent No.: US 8,339,253 B2
(45) Date of Patent: Dec. 25, 2012

(54) METHODS AND SYSTEMS FOR DISPLAYING VEHICLE REAR CAMERA IMAGES IN DIFFERENT MODES

(75) Inventors: William J. Chundrlik, Jr., Rochester Hills, MI (US); Brian Li, Farmington Hills, MI (US); Kent S. Lybecker, St. Clair Shores, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 572 days.

(21) Appl. No.: 12/555,647

(22) Filed: Sep. 8, 2009

(65) Prior Publication Data
US 2011/0057782 A1  Mar. 10, 2011

(51) Int. Cl.
*B60Q 1/00* (2006.01)

(52) U.S. Cl. ........ 340/436; 340/435; 340/903; 340/937; 348/148

(58) Field of Classification Search .......... 340/435, 340/436, 903, 937, 932.2; 348/148, 143; 701/1, 28, 35, 300, 301
See application file for complete search history.

(56) References Cited

U.S. PATENT DOCUMENTS

| | | | |
|---|---|---|---|
| 7,069,128 B2* | 6/2006 | Iwama | 701/36 |
| 7,598,887 B2* | 10/2009 | Sato et al. | 340/932.2 |
| 7,697,055 B2 | 4/2010 | Imoto et al. | |
| 2005/0174429 A1* | 8/2005 | Yanai | 348/148 |
| 2006/0069478 A1 | 3/2006 | Iwama | |
| 2007/0088488 A1* | 4/2007 | Reeves et al. | 701/117 |
| 2008/0007618 A1* | 1/2008 | Yuasa | 348/118 |
| 2008/0129539 A1* | 6/2008 | Kumon | 340/901 |
| 2008/0136911 A1 | 6/2008 | Shaffer et al. | |

FOREIGN PATENT DOCUMENTS

| | | |
|---|---|---|
| CN | 101234620 A | 8/2008 |
| CN | 101442618 A | 5/2009 |

OTHER PUBLICATIONS

Chinese Office Action, dated Aug. 31, 2012, for Chinese Patent Application No. 201010277950.0.

* cited by examiner

*Primary Examiner* — Hung T. Nguyen
(74) *Attorney, Agent, or Firm* — Ingrassia Fisher & Lorenz, P.C.

(57) ABSTRACT

A method for displaying images of a camera associated with a vehicle includes the steps of displaying the images in a first mode if a first condition is satisfied, and displaying the images in a second mode if a second condition is satisfied.

20 Claims, 5 Drawing Sheets

METHODS AND SYSTEMS FOR DISPLAYING VEHICLE REAR CAMERA IMAGES IN DIFFERENT MODES

TECHNICAL FIELD

The present invention generally relates to the field of vehicles and, more specifically, to methods and systems for displaying images behind vehicles using rear camera systems.

BACKGROUND

Certain vehicles today include a rear camera. Typically the rear camera provides a driver of the vehicle with a view from behind the vehicle when the vehicle is in a reverse driving mode. A rear camera can thus provide the driver with images that are useful for when the driver is operating the vehicle in reverse. However, depending on the circumstances in which the vehicle is being operated in reverse, different views may be desired for the images displayed from the rear camera. For example, a driver may prefer one type of view when parking the vehicle and another type of view when backing the vehicle up into possible rear cross traffic.

Accordingly, it is desirable to provide an improved method for displaying images of a vehicle rear camera, for example that provides different types of views or images depending on one or more circumstances as to how the vehicle is being operated in a reverse driving mode. It is also desirable to provide an improved system for such displaying of images of a vehicle rear camera. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method for displaying images of a camera associated with a vehicle is provided. The method comprises the steps of displaying the images in a first mode if a first condition is satisfied, and displaying the images in a second mode if a second condition is satisfied.

In accordance with another exemplary embodiment, a system for displaying images of a camera associated with a vehicle is provided. The system comprises one or more first sensors, one or more second sensors, and a processor. The one or more first sensors are configured to detect whether an object is in a first region proximate the vehicle. The one or more second sensors are configured to detect whether the object is in a second region proximate the vehicle. The processor is coupled to the one or more first seconds and to the one or more second sensors. The processor is configured to facilitate displaying the images in a first mode if the object is in the first region and displaying the images in a second mode if the object is in the second region.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
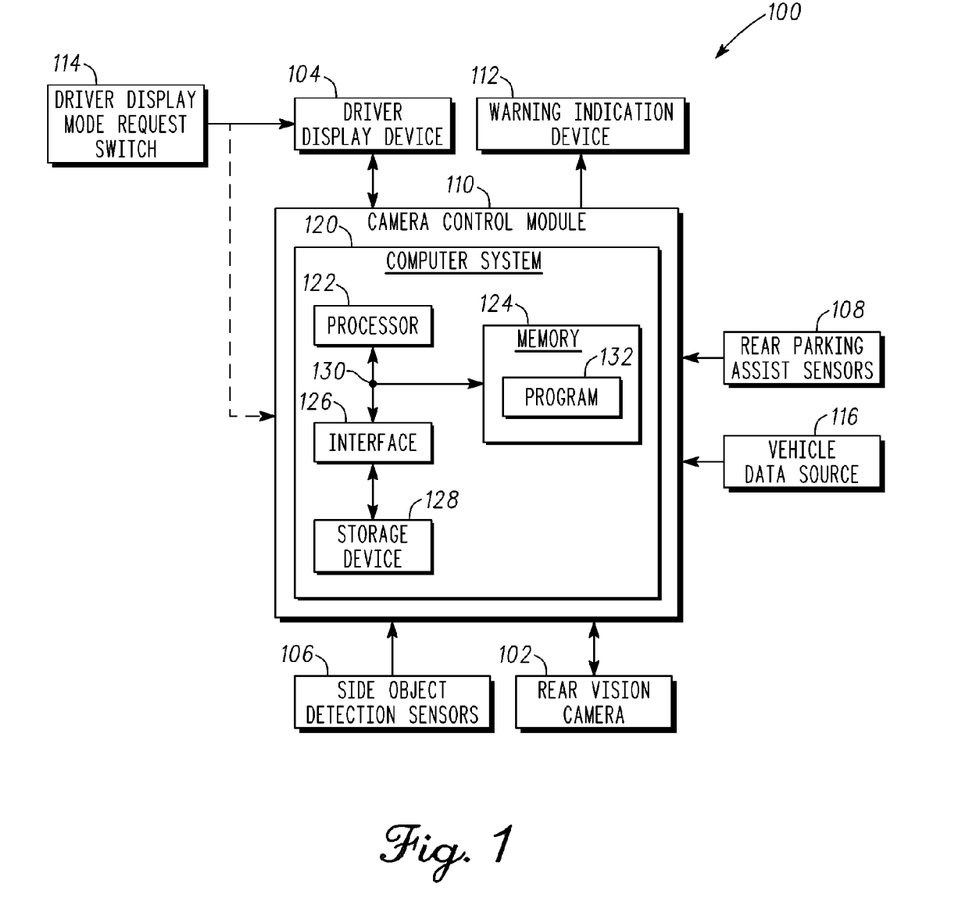
FIG. 1 is a functional block diagram of a control system for controlling the selection and display of rear camera images in a vehicle, in accordance with an exemplary embodiment.

FIG. 1 is a block diagram of an exemplary control system 100 for controlling the selection and display of rear camera images in a vehicle, in accordance with an exemplary embodiment. In one such exemplary embodiment, the vehicle comprises an automobile, such as a sedan, a sport utility vehicle, a van, or a truck. However, the type of vehicle may vary in different embodiments.

In the depicted embodiment, the control system 100 includes a rear vision camera 102, a driver display device 104, side object detection sensors 106, rear parking assist sensors 108, a camera control module 110, a warning indication device 112, a driver display mode request switch 114, and a vehicle data source 116. The control system 100 may include additional and/or different components in other embodiments.

The rear vision camera 102 obtains images from behind the vehicle and provides these images to the camera control module 110 for processing and for ultimate display for the driver on the driver display device 104. In an exemplary embodiment, the rear vision camera 102 is configured to capture different image fields of view behind the vehicle based on instructions provided by the camera control module 110. Specifically, in an exemplary embodiment, the rear vision camera 102 is configured to capture and focus on different angles of views behind the vehicle based on the instructions provided by the camera control module 110. Also in an exemplary embodiment, the rear vision camera 102 is disposed on a rear section of the vehicle.

The driver display device 104 receives and displays the images emanating from the rear vision camera 102 for the driver in accordance with instructions provided by the camera control module 110. In an exemplary embodiment, the driver display device 104 is configured to display different image fields of view behind the vehicle. Specifically, in one embodiment, the driver display device 104 is configured to display different angles of views behind the vehicle.

The driver display device 104 is preferably disposed in a location that is easily viewed by the driver of the vehicle. For example, in one embodiment, the driver display device 104 is disposed within a rear view mirror of the vehicle. In another exemplary embodiment, the driver display device 104 is disposed within a navigation system of a vehicle. The driver display device 104 may also be disposed in other places of the vehicle such as, by way of example only, within or near a dashboard of the vehicle.

The side object detection sensors 106 detect the presence of approaching vehicles and/or pedestrians that may be approaching the vehicle as part of rear cross traffic from a road environment behind and to the right and/or left of the vehicle, for example when the vehicle is backing up into potential traffic. The side object detection sensors 106 provide information or signals pertaining to the presence or absence of any such approaching vehicles and/or pedestrians to the camera control module 110 for processing and for use in determining the appropriate mode for the images obtained by the rear vision camera 102 to be displayed by the driver display device 104. In an exemplary embodiment, one or more of the side object detection sensors 106 are disposed on a left side or section of the vehicle, and one or more other of the side object detection sensors 106 are disposed on a right side or section of the vehicle. It will be appreciated that the location and/or number of the side object detection sensors 106 may vary in different embodiments.

The rear parking assist sensors 108 detect the presence of any obstacles or objects in back of the vehicle, for example when the vehicle is being parked in a parking space. The rear parking assist sensors 108 provide information or signals pertaining to the presence or absence of any such obstacles or objects to the camera control module 110 for processing and for use in determining the appropriate images (or mode for displaying the images) obtained by the rear vision camera 102 to be displayed by the driver display device 104. In an exemplary embodiment, the rear parking assist sensors 108 are disposed on a rear section of the vehicle. It will be appreciated that the location and/or number of the rear parking assist sensors 108 may vary in different embodiments.

The driver display mode request switch 114 receives input from a driver of the vehicle regarding a preference, if any, as to the display of images from the rear vision camera 102. In one embodiment, the driver display mode request switch 114 is a button or other input device that the driver can engage if the driver desires that the images from the rear vision camera 102 be displayed in a rear park assist mode or a with a relatively smaller region directly behind the vehicle or a rear cross traffic view mode with a relatively larger region behind and to the right and left of the vehicle. The vehicle data source 116 provides data from one or more modules or systems residing within or coupled to the vehicle, such as, by way of example, only, information as to a speed and direction of the vehicle.

The camera control module 110 is the central control unit of the control system 100, and is coupled to each of the rear vision camera 102, the driver display device 104, the side object detection sensors 106, the rear parking assist sensors 108, the warning indication device 112, the driver display mode request switch 114, and the vehicle data source 116. The camera control module 110 receives the above-described information and signals from the side object detection sensors 106 and the rear parking assist sensors 108, the driver display mode request switch 114, and the vehicle data source 116, and determines the image mode for the display of the rear vision camera 102 images based at least in part on this information and these signals in an exemplary embodiment.

For example, in one embodiment, the camera control module 110 provides instructions for the rear vision camera 102 to provide images to the driver display device 104 in a rear park assist mode with a relatively smaller and less distorted region directly behind the vehicle when the rear parking assist sensors 108 detect an obstacle behind the vehicle. Also in one embodiment, the camera control module 110 provides instructions for the rear vision camera 102 to provide images to the driver display device 104 in a rear cross traffic view mode with a relatively larger region behind and to the right and left of the vehicle when the side object detection sensors 106 detect that one or more vehicles, pedestrians, or both, are approaching the vehicle from the left and/or from the right and the vehicle gear is in reverse. Also in one embodiment, the camera control module 110 provides instructions for the rear vision camera 102 to provide images to the driver display device 104 in a rear park assist mode with a relatively smaller and less distorted region directly behind the vehicle when the vehicle gear is in reverse and any of the following additional conditions are also satisfied: the vehicle speed is greater or equal than a predetermined value, the vehicle has traveled a predetermined distance or a predetermined amount of time has elapsed after vehicle movement is detected, or a predetermined amount of time has elapsed after the vehicle was put in reverse.

In certain alternate embodiments, the camera control module 110 provides instructions to the driver display device 104 for implementing the different image modes. For example, in certain embodiments in which the rear vision camera 102 provides multiple images from different views at the same time, the camera control module 110 provides instructions as to which of the multiple images to display at any particular point in time, to thereby implement a selected image mode.

For example, in one embodiment, if the driver provides a request for assistance with parking, then the camera control module 110 provides instructions for the driver display device 104 to display the rear camera images in the above-described rear park assist mode with a relatively smaller and less distorted region directly behind the vehicle. Also in one embodiment, if the driver provides a request for a view of rear cross traffic, then the camera control module 110 provides instructions for the driver display device 104 to display the rear camera images in the above-described rear cross traffic view mode with a relatively larger region behind and to the right and left of the vehicle.

Regardless of how the instructions are provided, in an exemplary embodiment, the camera control module 110 is also coupled to receive a driver display mode request from the driver display mode request switch 114 from the driver and to receive vehicle data from the vehicle data source 116. Also in an exemplary embodiment, the camera control module 110 determines the image mode for the rear vision camera 102 images also based at least in part on the driver display mode request, if any, received by the driver of the vehicle, along with the vehicle data obtained from the vehicle data source 116. For example, in one embodiment, the camera control module 110 uses the vehicle data to determine whether the vehicle is in a reverse driving mode (for example, if the gear selector is in reverse), and the camera control module 110 provides instructions for the display of the rear camera images only on the further condition that the vehicle is in a reverse driving mode.

Also in an exemplary embodiment, the camera control module 110 is coupled to provide instructions to the warning indication device 112 to provide a warning for the driver of the vehicle if a collision is imminent. Specifically, in an exemplary embodiment, the camera control module 110 provides instructions for the warning indication device 112 to provide a warning for the driver if one or more approaching vehicles and/or pedestrians are close enough to the vehicle that a collision would occur within a predetermined amount of time if the vehicle and the approaching vehicles and/or pedestrians were to continue in their present or projected trajectories. In one embodiment, the warning is provided if the time to collision is less than or equal to two seconds. However, this may vary in other embodiments. Also, in one embodiment, an audio warning is provided in such circumstances. However, it will be appreciated that one or more other types of warnings, such as a visual or haptic warning, may be utilized instead of or in addition to such an audio warning in various other embodiments.

In the depicted embodiment, the camera control module 110 comprises a computer system 120. The computer system 120 includes a processor 122, a memory 124, an interface 126, a storage device 128, and a computer bus 130. The processor 122 performs the computation and control functions of the computer system 120 and the control system 100, and may comprise any type of processor or multiple processors, single integrated circuits such as a microprocessor, or any suitable number of integrated circuit devices and/or circuit boards working in cooperation to accomplish the functions of a processing unit. During operation, the processor 122 executes one or more programs 132 contained within the memory 124 and, as such, controls the general operation of the computer system 120.

The memory 124 can be any type of suitable memory. This could include the various types of dynamic random access memory (DRAM) such as SDRAM, the various types of static RAM (SRAM), and the various types of non-volatile memory (PROM, EPROM, and flash). Also as depicted in FIG. 1, the memory 124 preferably stores the program 132 for use in executing the steps of various processes such as the process 200 of FIG. 2. The computer bus 130 serves to transmit programs, data, status and other information or signals between the various components of the computer system 120.

The interface 126 allows communication to the computer system 120, for example from a system driver and/or another computer system, and can be implemented using any suitable method and apparatus. It can include one or more network interfaces to communicate with other systems or components. The interface 126 may also include one or more network interfaces to communicate with technicians, and/or one or more storage interfaces to connect to storage apparatuses, such as the storage device 128. In one embodiment, the camera control module 110 and the computer system 120 receive the driver display mode request from the driver display mode request switch 114 via the interface 126, and information pertaining to the driver display mode request is then provided from the interface 126 to the processor 122 via the computer bus 130 for processing.

The storage device 128 can be any suitable type of storage apparatus, including direct access storage devices such as hard disk drives, flash systems, floppy disk drives and optical disk drives. In one embodiment, the storage device 128 comprises a program product from which memory 124 can receive a program 132 that executes one or more embodiments of one or more processes, such as the process 200 of FIG. 2 or portions thereof. In another embodiment, the program product may be directly stored in and/or otherwise accessed by the memory 124 and/or a disk such as that referenced below.

The computer bus 130 can be any suitable physical or logical means of connecting computer systems and components. This includes, but is not limited to, direct hard-wired connections, fiber optics, infrared and wireless bus technologies. During operation, the program 132 is stored in the memory 124 and executed by the processor 122. It will be appreciated that the control system 100 may differ from the embodiment depicted in FIG. 1, for example in that the control system 100 may be coupled to or may otherwise utilize one or more remote computer systems and/or other control systems.

It will be appreciated that while this exemplary embodiment is described in the context of a fully functioning computer system, those skilled in the art will recognize that certain of these mechanisms are capable of being distributed as a program product in a variety of forms with various types of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 120 may also otherwise differ from the embodiment depicted in FIG. 1, for example in that the computer system 120 may be coupled to or may otherwise utilize one or more remote computer systems and/or other control systems.

Figure 2:
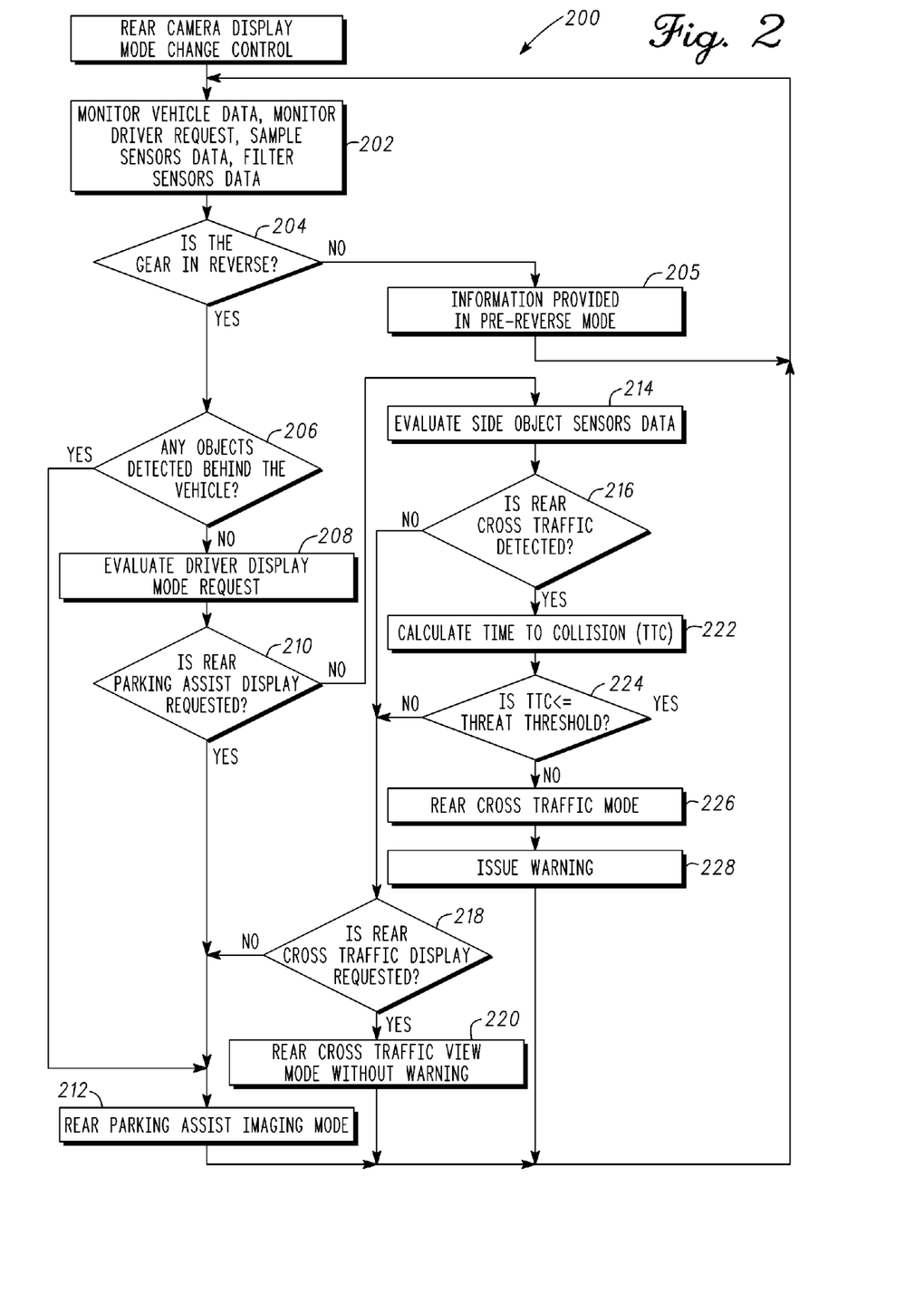
FIG. 2 is a flowchart of a process for controlling the selection and display of rear camera images in a vehicle, and that can be utilized in connection with the control system of FIG. 1, in accordance with an exemplary embodiment.

FIG. 2 is a flowchart of a process 200 for controlling the display of rear camera images in a vehicle, in accordance with an exemplary embodiment. The process 200 can be implemented in connection with the control system 100 of FIG. 1 and/or the computer system 120 of FIG. 1 and/or program products utilized therewith, in accordance with an exemplary embodiment.

As depicted in FIG. 2, the process 200 begins with the step of monitoring data and information (step 202). In one embodiment, the data and information include a driver display mode request from the driver display mode request switch 114 of FIG. 1 as to the driver's preference, if any, for how the rear camera images are to be displayed. Also in one embodiment, the data and information include data and information as to any nearby objects, approaching vehicles, and/or pedestrians from the side object detection sensors 106 and the rear parking assist sensors 108 of FIG. 1, and the vehicle data from the vehicle data source 116 of FIG. 1, for example with information as to whether the vehicle is in a reverse driving mode (for example, if the gear selector is in reverse), among other possible information and data pertaining to the vehicle. In addition, in one embodiment, the information and data are monitored by the processor 122 of FIG. 1.

A determination is made as to whether the vehicle is in a reverse driving mode (step 204). In one embodiment, this determination is made by the processor 122 of FIG. 1 using the data and information monitored in step 202 discussed above. Specifically, in one embodiment, this determination is made by the processor 122 of FIG. 1 based on whether a gear selector of the vehicle is placed in a reverse driving mode position. However, this may vary in other embodiments.

If a determination is made that the vehicle is not in a reverse driving mode, then the driver display device 104 of FIG. 1 displays information provided in a pre-reverse mode (step 205). Following step 205, the process returns to the above-described step 202. The monitoring of the data and information continues until there is a determination in an iteration of step 204 that the vehicle is in a reverse driving mode.

Once a determination is made in any iteration of step 204 that the vehicle is in a reverse driving mode, a determination is then made as to whether any objects are detected behind the vehicle (step 206). In one embodiment, the determination is made as to whether any objects are in a first region proximate the vehicle, specifically directly or nearly directly in back of the vehicle such that the objects would be an impediment to parking the vehicle. For example, in one embodiment, such an object is considered to be an impediment or obstacle to parking the vehicle if the object is within ten feet, by way of example only, behind the vehicle. However, this may vary in other embodiments. Also in one embodiment, this determination is made by the processor 122 of FIG. 1 based on information provided by the rear parking assist sensors 108 of FIG. 1 and monitored by the processor 122 of FIG. 1 in step 202 above.

Figure 3:
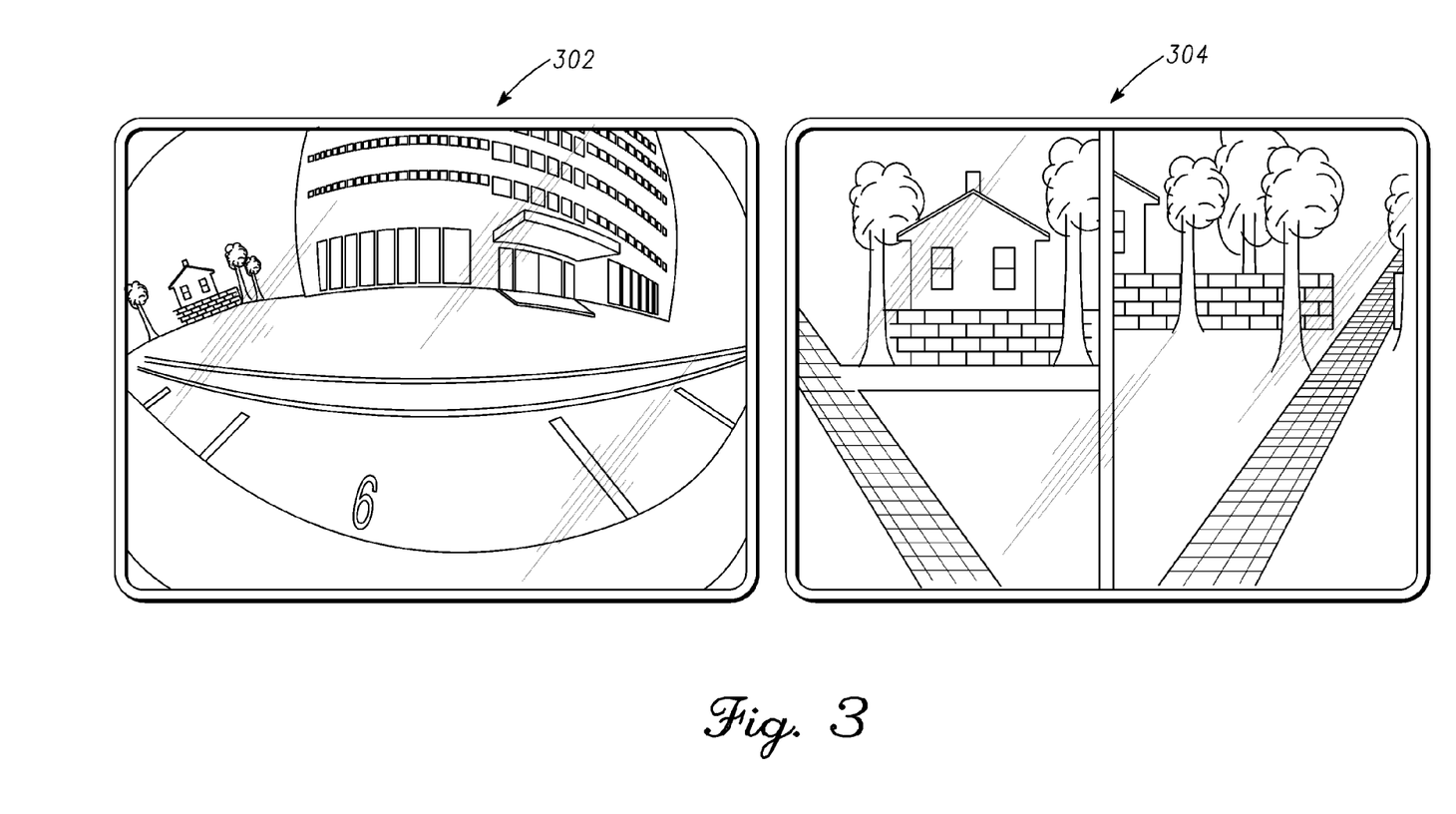
FIG. 3 is a depiction of exemplary views of the rear camera images in the vehicle for the control system of FIG. 1 and the process or FIG. 2 for different scenarios in which the vehicle is being operated, in accordance with an exemplary embodiment.

If a determination is made in step 206 that one or more such objects are behind the vehicle, then the process skips to step 212, in which the rear camera images are displayed in a rear parking assist mode. Specifically, in an exemplary embodiment, during step 212 the rear camera images are displayed in the rear parking assist mode focused on a parking region behind the vehicle. FIG. 3 depicts one such rear parking assist view 302 in accordance with one embodiment.

Also in one embodiment, during step 212 the rear camera images are displayed in the rear parking assist mode with a first field of view that is a relatively smaller but less distorted field of view (as compared with the rear cross traffic view mode described later in connection with step 220). For example, in one embodiment, during step 212 the rear camera images are displayed in the rear parking assist mode with a first field of view of approximately 120 degrees centered around a focal point directly behind the vehicle. However, this may vary in other embodiments.

Also in one embodiment, during step 212 the rear camera images of the rear vision camera 102 of FIG. 1 are displayed by the driver display device 104 of FIG. 1. Following step 212, the process returns to the above-described step 202, as the data and information continue to be monitored, preferably also by the processor 122 of FIG. 1.

Conversely, if a determination is made in step 206 that no such objects are behind the vehicle, then a driver display mode request, if any, is evaluated (step 208). In an exemplary embodiment, the driver display mode request is received from the driver display mode request switch 114 of FIG. 1, and pertains to any preferences that the driver of the vehicle may have indicated as to a viewing mode for the display of the rear camera images. Also in an exemplary embodiment, this evaluation is conducted by the processor 122 of FIG. 1 using information from the driver display mode request switch 114 of FIG. 1 during the above-described step 202.

A determination is then made as to whether a rear parking assist display is requested by the driver (step 210). In one embodiment, this determination is made by the processor 122 of FIG. 1 based on the evaluation of the driver display mode request in step 208 above.

If it is determined in step 210 that the rear parking assist display is requested, then the process proceeds to the above-described step 212, in which the rear camera images are displayed in the above-described rear parking assist mode. As discussed above, preferably during step 212 the rear camera images are displayed in the rear parking assist mode with a first field of view that is a relatively smaller but less distorted field of view (as compared with the rear cross traffic view mode described later in connection with step 220), and are preferably displayed by the driver display device 104 of FIG. 1 based on instructions provided by the processor 122 of the camera control module 110 of FIG. 1. In addition, as discussed above, following step 212, the process preferably returns to the above-described step 202, as the data and information continue to be monitored, preferably also by the processor 122 of FIG. 1.

Conversely, if it is determined in step 210 that the rear parking assist display is not requested, then side object sensor data is evaluated (step 214). In one embodiment, the side object sensor data is obtained from the side object detection sensors 106 during the above-described step 202, and is evaluated by the processor 122 of FIG. 1 during step 214. Also in one embodiment, the side object sensor data includes information as to rear cross traffic behind and to the right and/or left of the vehicle, including information as to any approaching vehicles and/or pedestrians.

A determination is then made as to whether there is any rear cross traffic (step 216). In one embodiment, this determination is made by the processor 122 of FIG. 1 based on the evaluation conducted in step 214 discussed above. In one embodiment, this determination comprises a determination as to whether any objects (e.g., other vehicles, pedestrians, or other objects) are in a second region proximate the vehicle, and specifically to the right or the left of the vehicle. Also in one embodiment, this determination comprises a determination as to whether there are any vehicles and/or pedestrians approaching the vehicle from the right and/or left sides that may pose a collision threat to the vehicle as the vehicle operates in reverse if the vehicle and the approaching vehicles and/or pedestrians continue in their present or projected trajectories. For example, in one embodiment, approaching vehicles and/or pedestrians may be considered as part of rear cross traffic if they are within fifty feet, by way of example only, from the vehicle. However, this may vary in other embodiments.

If it is determined that there is no rear cross traffic, then a determination is made as to whether a rear cross traffic display view is requested (step 218). In one embodiment, this determination is made by the processor 122 of FIG. 1 based on the evaluation of the driver display mode request in step 208 above.

If a determination is made in step 218 that the driver is requesting that the rear camera images be displayed with a rear cross traffic view, then the process proceeds to step 220, in which the rear camera images are displayed in a rear cross traffic view mode. Specifically, in one embodiment, during step 220 the rear camera images are displayed in the rear cross traffic view mode focused on a cross traffic region behind and to the left and right of the vehicle. FIG. 3 depicts one such rear cross traffic view 304 in accordance with one embodiment.

Also in one embodiment, during step 220 the rear camera images are displayed in the rear cross traffic view mode with a second field of view that has relatively larger field of view (as compared with the first field of view of the rear parking assist mode described earlier in connection with step 212). Also in one embodiment, during step 220 the rear camera images are displayed in the rear cross traffic view mode with a second field of view of approximately 180 degrees centered around a focal point directly behind the vehicle. However, this may vary in other embodiments. In addition, in one embodiment, during step 220 the rear camera images of the rear vision camera 102 of FIG. 1 are displayed by the driver display device 104 of FIG. 1. The process then returns to the above-described step 202, in which the data and information continue to be monitored.

Conversely, if a determination is made in step 218 that the driver is not requesting that the rear camera images be displayed with a rear cross traffic view, then the process proceeds instead to the above-referenced step 212, in which the rear camera images are displayed in the rear parking assist mode. Specifically, as discussed above, in one embodiment during step 212 the rear camera images are displayed in the rear parking assist mode with a first field of view that is a relatively smaller but less distorted field of view (as compared with the rear cross traffic view mode of step 220, described above).

Returning now to step 216, if a determination is made that there is rear cross traffic, then a calculation is also performed as to an estimated time to collision from the rear cross traffic, if any (step 222). In an exemplary embodiment, the estimated time to collision comprises an estimated amount of time in which one or more approaching vehicles and/or pedestrians of the oncoming traffic are likely to collide with the vehicle if the approaching vehicles and/or pedestrians and the vehicle continue on their respective courses. Also in an exemplary embodiment, this calculation is performed by the processor 122 of FIG. 1 based on the evaluation conducted in step 216.

A determination is made as to whether the time to collision calculated in step 222 is less than or equal to a predetermined threshold (step 224). In one embodiment, this determination is made by the processor 122 of FIG. 1. Also in one embodiment, the predetermined threshold is equal to approximately two seconds. However, different values for the predetermined threshold may be used in various embodiments. If a determination is made that the time to collision is greater than the predetermined threshold, then the process proceeds to the above-referenced step 218.

Conversely, if a determination is made in step 224 that the time to collision calculated in step 222 is less than or equal to the predetermined threshold, then the rear camera images are displayed in the rear cross traffic view mode with the second field of view (step 226). In one embodiment, the rear cross traffic view mode of step 226 is identical to that of step 220 and is implemented in the same manner as in step 220. However, in this embodiment, a warning is issued following step 226, as described immediately below, but not following step 220.

Following step 226, a warning is issued (step 228). In one embodiment, the warning is provided by the warning indication device 112 of FIG. 1 based on instructions provided by the processor 122 of FIG. 1. Also in one embodiment, the warning comprises an audio warning or alert. In various other embodiments, one or more other different types of warnings, such as a visual or haptic warning by way of example, may be utilized instead of or in addition to an audio warning. The process then returns to the above-described step 202, in which the data and information continue to be monitored.

In the depicted embodiment, the rear camera images are displayed in the rear cross traffic view in step 226 when the time to collision is less than or equal to the predetermined threshold or in step 220 when the rear cross traffic display view is requested. In an alternate embodiment, not depicted in FIG. 2, the rear camera images are displayed in the rear cross traffic view of steps 220 and 226 whenever rear cross traffic is detected in step 216, regardless of whether the time to collision is less than or equal to the predetermined threshold.

Figure 4A:
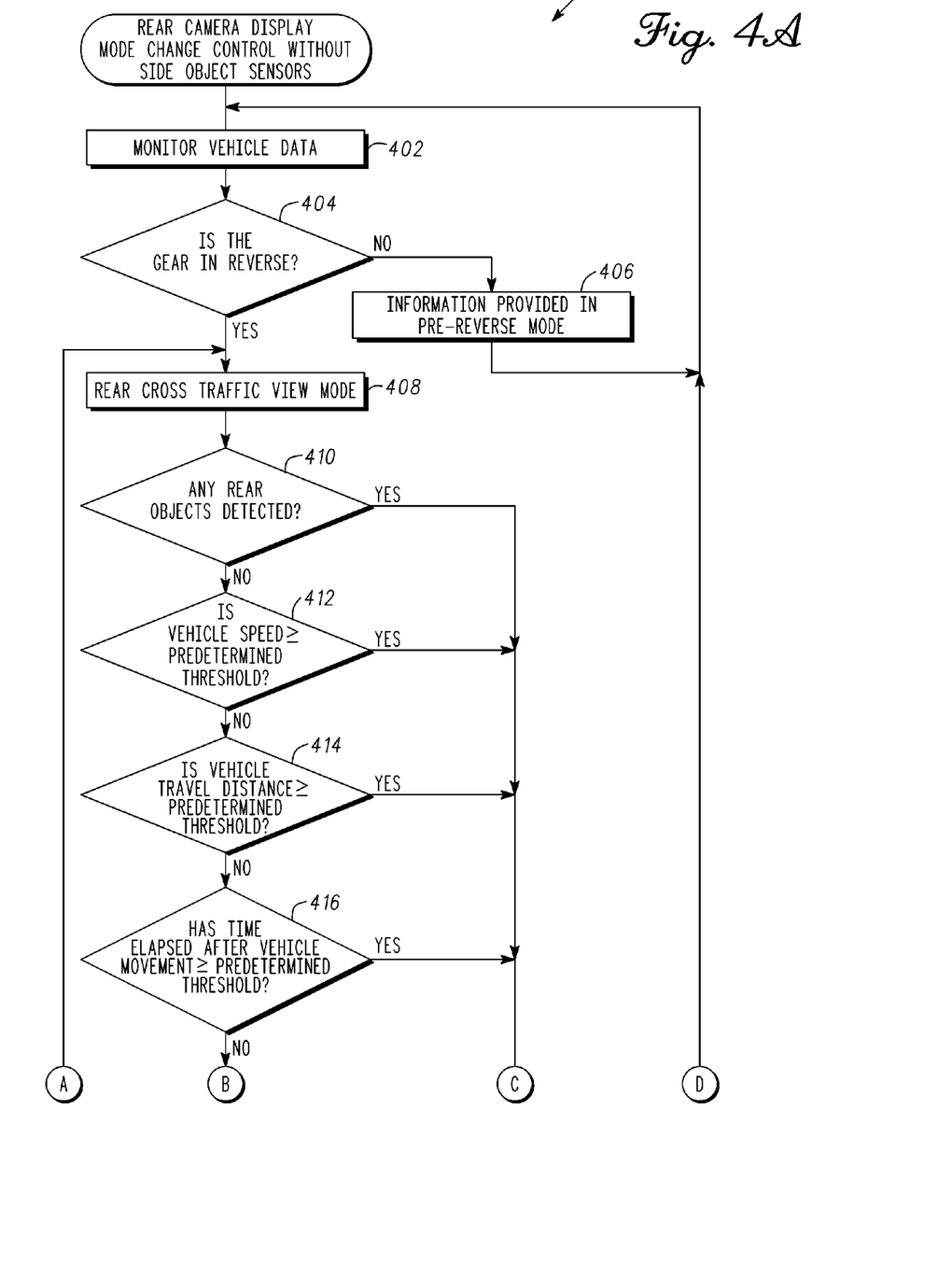
FIG. 4 is a flowchart of a second process for controlling the selection and display of rear camera images in a vehicle, and that can be utilized in connection with the control system of FIG. 1, in accordance with another exemplary embodiment.
Figure 4B:
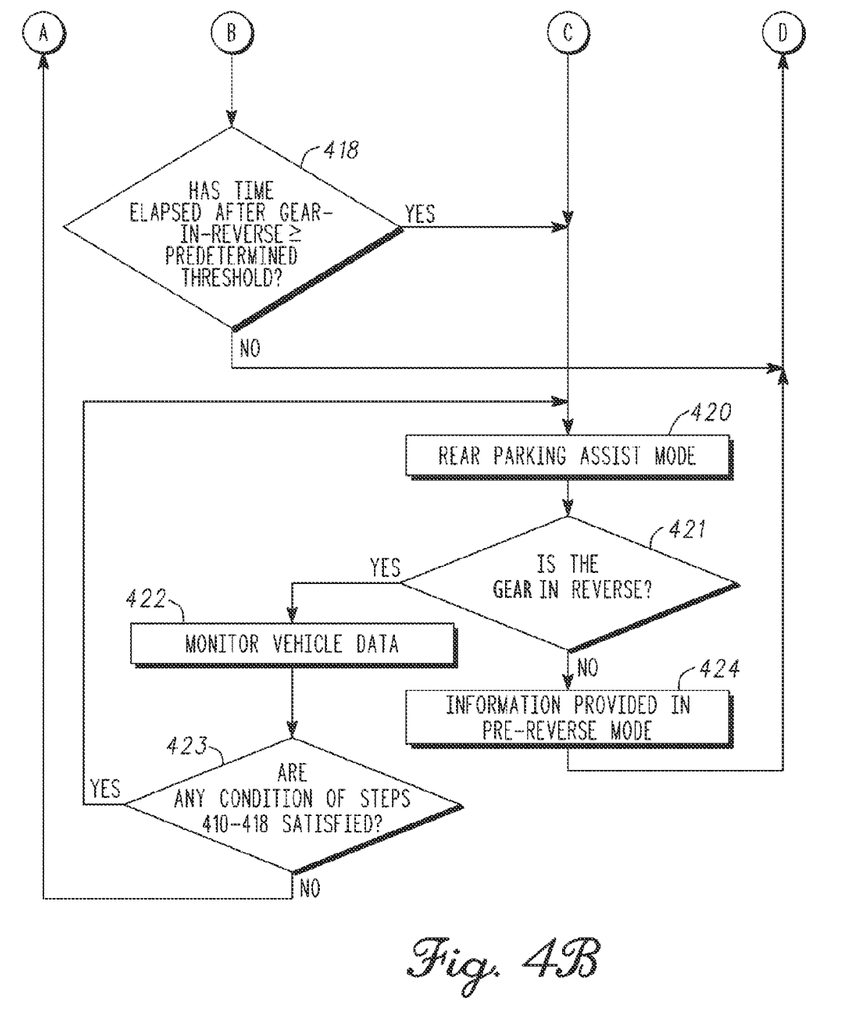

FIG. 4 is a flowchart of a second process 400 for controlling the display of rear camera images in a vehicle, in accordance with another exemplary embodiment. The second process 400 can be implemented in connection with the control system 100 of FIG. 1 and/or the computer system 120 of FIG. 1 and/or program products utilized therewith, in accordance with an exemplary embodiment. In one embodiment, the second process 400 is for use in conjunction with a vehicle that does not have side object detection sensors.

As depicted in FIG. 4, the second process 400 begins with the step of monitoring data and information (step 402). In one embodiment, the data and information include a driver display mode request from the driver display mode request switch 114 of FIG. 1 as to the driver's preference, if any, for how the rear camera images are to be displayed. Also in one embodiment, the data and information include data and information as to any nearby objects from the rear parking assist sensors 108 of FIG. 1, and the vehicle data from the vehicle data source 116 of FIG. 1, for example with information as to whether the vehicle is in a reverse driving mode (for example, if the gear selector is in reverse), among other possible information and data pertaining to the vehicle. In addition, in this embodiment, the information and data are monitored by the processor 122 of FIG. 1.

A determination is made as to whether the vehicle gear is in a reverse driving mode (step 404). In one embodiment, this determination is made by the processor 122 of FIG. 1 using the data and information monitored in step 402 discussed above. Specifically, in one embodiment, this determination is made by the processor 122 of FIG. 1 based on whether a gear selector of the vehicle is placed in a reverse driving mode position. However, this may vary in other embodiments.

If a determination is made that the vehicle is not in a reverse driving mode, then the driver display device 104 of FIG. 1 displays information provided in a pre-reverse mode (step 406). Following step 406, the process returns to the above-described step 402, as the data and information continue to be monitored, preferably by the processor 122 of FIG. 1. The monitoring of the data and information continues until there is a determination in an iteration of step 404 that the vehicle is in a reverse driving mode.

Once a determination is made in any iteration of step 404 that the vehicle is in a reverse driving mode, then the process proceeds to step 408, in which the rear camera images are displayed in a rear cross traffic view mode. Specifically, in one embodiment, during step 408 the rear camera images are displayed in the rear cross traffic view mode focused on a cross traffic region behind and to the left and right of the vehicle. Also in one embodiment, the rear cross traffic view mode of step 408 corresponds with the rear cross traffic view mode of step 220 of the process 200 of FIG. 2 and the exemplary rear cross traffic view 304 of FIG. 3.

Also in one embodiment, during step 408 the rear camera images are displayed in the rear cross traffic view mode with a second field of view that is a relatively larger field of view (as compared with the first field of view of the rear parking assist mode described further below in connection with step 420). Also in one embodiment, during step 408 the rear camera images are displayed in the rear cross traffic view mode with a second field of view of approximately 180 degrees centered around a focal point directly behind the vehicle. However, this may vary in other embodiments. In addition, in one embodiment, during step 408 the rear camera images of the rear vision camera 102 of FIG. 1 are displayed by the driver display device 104 of FIG. 1.

A determination is then made as to whether any objects are detected behind the vehicle (step 410). In one embodiment, the determination is made as to whether any objects are directly or nearly directly in back of the vehicle such that the objects would be an impediment to parking the vehicle. For example, in one embodiment, such an object is considered to be an impediment to parking the vehicle if the object is within ten feet, by way of example only, behind the vehicle. However, this may vary in other embodiments. Also in one embodiment, this determination is made by the processor 122 of FIG. 1 based on information provided by the rear parking assist sensors 108 of FIG. 1 and monitored by the processor 122 of FIG. 1 in step 202 above.

If a determination is made in step 410 that one or more such objects are behind the vehicle, then the process proceeds to step 420, in which the rear camera images are displayed in a rear parking assist mode. Specifically, in one embodiment, during step 420 the rear camera images are displayed in the rear parking assist mode focused on a parking region behind the vehicle. Also in this embodiment, the rear parking assist mode of step 420 corresponds with the rear parking assist mode of step 212 of the process 200 of FIG. 2 and the exemplary rear parking assist view 302 of FIG. 3.

In addition, in one embodiment, the rear camera images are displayed in the rear parking assist mode with a first field of view that is a relatively smaller but less distorted field of view (as compared with the rear cross traffic view mode described previously in connection with step 408). For example, in one exemplary embodiment, during step 420 the rear camera images are displayed in the rear parking assist mode with a first field of view of approximately 120 degrees centered around a focal point directly behind the vehicle. However, this may vary in other embodiments.

Also in an exemplary embodiment, during step 420 the rear camera images of the rear vision camera 102 of FIG. 1 are displayed by the driver display device 104 of FIG. 1. Following step 420, the process proceeds to step 421, in which a determination is made as to whether the vehicle gear is in reverse, as will be described further below.

Returning now to step 410, if a determination is made that no such objects are behind the vehicle, then a determination is made as to whether a vehicle speed is greater than or equal to a first predetermined threshold (step 412). In one embodiment, this determination is made by the processor 122 of FIG. 1 using information monitored or obtained from the vehicle data source 116 of FIG. 1 during the monitoring of the vehicle data in step 402 above.

If a determination is made in step 412 that the vehicle speed is greater than or equal to the first predetermined threshold, then the process proceeds to the above-referenced step 420, in which the rear camera images are displayed in the rear parking assist mode. As discussed, above, the rear parking assist mode of step 420 corresponds with the rear parking assist mode of step 212 of the process 200 of FIG. 2 and the exemplary rear parking assist view 302 of FIG. 3. Also as discussed above, in an exemplary embodiment, during step 420 the rear camera images of the rear vision camera 102 of FIG. 1 are displayed by the driver display device 104 of FIG. 1. Following step 420, the process returns to the step 421, described further below.

Conversely, if a determination is made in step 412 that the vehicle speed is less than the first predetermined threshold, then a determination is made as to whether a vehicle travel distance is greater than or equal to a second predetermined threshold (step 414). In one embodiment, this determination is made by the processor 122 of FIG. 1 using information monitored or obtained from the vehicle data source 116 of FIG. 1 during the monitoring of the vehicle data in step 402 above. Also in one embodiment, the determination in step 414 comprises a determination as to whether a distance the vehicle has traveled since the vehicle has most recently been put in a reverse mode is greater than or equal to the second predetermined threshold.

If a determination is made in step 414 that the vehicle travel distance is greater than or equal to the second predetermined threshold, then the process proceeds to the above-referenced step 420, in which the rear camera images are displayed in the rear parking assist mode. As discussed, above, the rear parking assist mode of step 420 corresponds with the rear parking assist mode of step 212 of the process 200 of FIG. 2 and the exemplary rear parking assist view 302 of FIG. 3. Also as discussed above, in one embodiment, during step 420 the rear camera images of the rear vision camera 102 of FIG. 1 are displayed by the driver display device 104 of FIG. 1. Following step 420, the process returns to step 421, described further below.

Conversely, if a determination is made in step 414 that the vehicle travel distance is less than the second predetermined threshold, then a determination is made as to whether an elapsed amount of time after vehicle movement has commenced is greater than or equal to a third predetermined threshold (step 416). In one embodiment, this determination is made by the processor 122 of FIG. 1 using information monitored or obtained from the vehicle data source 116 of FIG. 1 during the monitoring of the vehicle data in step 402 above.

If a determination is made in step 416 that the elapsed amount of time after vehicle movement has commenced is greater than or equal to the third predetermined threshold, then the process proceeds to the above-referenced step 420, in which the rear camera images are displayed in the rear parking assist mode. As discussed, above, the rear parking assist mode of step 420 corresponds with the rear parking assist mode of step 212 of the process 200 of FIG. 2 and the exemplary rear parking assist view 302 of FIG. 3. Also as discussed above, in one embodiment, during step 420 the rear camera images of the rear vision camera 102 of FIG. 1 are displayed by the driver display device 104 of FIG. 1. Following step 420, the process returns to step 421, described further below.

Conversely, if a determination is made in step 416 that the elapsed amount of time after vehicle movement has commenced is less than the third predetermined threshold, then a determination is made as to whether an elapsed amount of time after the vehicle has been put in reverse is greater than or equal to a fourth predetermined threshold (step 418). In one embodiment, this determination is made by the processor 122 of FIG. 1 using information monitored or obtained from the vehicle data source 116 of FIG. 1 during the monitoring of the vehicle data in step 402 above. If a determination is made in step 418 that the elapsed amount of time after the vehicle has been put in reverse is less than the fourth predetermined threshold, then the process returns to the above-described step 402, and additional vehicle data is monitored, preferably by the processor 122 of FIG. 1.

Conversely, if a determination is made in step 418 that the elapsed amount of time after the vehicle has been put in reverse is greater than or equal to the fourth predetermined threshold, then the process proceeds to the above-referenced step 420, in which the rear camera images are displayed in the rear parking assist mode. As discussed, above, the rear parking assist mode of step 420 corresponds with the rear parking assist mode of step 212 of the process 200 of FIG. 2 and the exemplary rear parking assist view 302 of FIG. 3. Also as discussed above, in one embodiment, during step 420 the rear camera images of the rear vision camera 102 of FIG. 1 are displayed by the driver display device 104 of FIG. 1. Following step 420, the process returns to step 421, described directly below.

During step 421, a determination is made as to whether the vehicle gear is in reverse. In one embodiment, this determination is made by the processor 122 of FIG. 1 in the same manner described above in connection with step 404.

If it is determined in step 421 that the vehicle is in reverse, then data and information continue to be monitored (step 422). In one embodiment, the monitoring of data and information in step 422 is similar or identical to the monitoring of data and information in the above-described step 402. Based on this monitoring of data and information, a determination is made as to whether any of the conditions of steps 410-418 are still satisfied (step 423). In one embodiment, this determination is also made by the processor 122 of FIG. 1.

If a determination is made in step 423 that any of the conditions of steps 410-418 are satisfied (that is, if any one or more of the following conditions are still currently satisfied: (a) one or more such objects are behind the vehicle, (b) the vehicle speed is greater than or equal to the first predetermined threshold (preferably including hysteresis), (c) the vehicle travel distance is greater than or equal to the second predetermined threshold, (d) the elapsed amount of time after vehicle movement has commenced is greater than or equal to the third predetermined threshold, or (e) the elapsed amount of time after the vehicle has been put in reverse is greater than or equal to the fourth predetermined threshold), then the process returns to step 420, as the rear camera images are displayed in the rear parking assist mode of step 420. In an exemplary embodiment, the rear camera images are displayed in the rear parking assist mode of step 420 for the remainder of the time in which the vehicle remains in reverse and one or more of the conditions of steps 410-418 are satisfied. Once a determination is made in an iteration of step 423 that none of the conditions of steps 410-418 are currently satisfied (that is, if none of the conditions (a)-(d) referenced above in connection with step 421 are currently satisfied), then the process returns to the above-referenced step 408, and the rear camera images are displayed in the rear cross traffic view mode.

Returning now to step 421, once it is determined in an iteration of step 421 that the vehicle is not in reverse, then the driver display device 104 of FIG. 1 displays information provided in a pre-reverse mode (step 424). In an exemplary embodiment, the pre-reverse mode of step 424 corresponds to the pre-reverse mode of step 406. Following step 424, the process returns to the above-described step 402, as the data and information continue to be monitored, preferably by the processor 122 of FIG. 1.

In certain embodiments of the second process 400 of FIG. 4, user input may also be used in selecting the mode for the display of the rear camera images. For example, in certain embodiments, a driver display mode request may be evaluated similar to the step 208 of the process 200 of FIG. 2. In such embodiments, the rear cross traffic view mode of step 408 may be utilized if the user so requests. Similarly, the rear parking assist view mode may also be utilized if the user so requests.

Accordingly, improved methods and systems are provided for controlling the display of rear camera images in a vehicle. The improved methods and systems provide for the display of rear camera images in different modes depending on the circumstances pertaining to the vehicle's operation in reverse. For example, in accordance with one exemplary embodiment (corresponding to an exemplary embodiment of FIG. 2), the rear camera images are displayed in a rear parking assist mode upon request of the driver or if an obstacle is present behind the vehicle while the vehicle is in reverse. Similarly, also in accordance with an exemplary embodiment, the rear camera images are displayed in a rear cross traffic view mode upon request of the driver or when one or more pedestrians and/or vehicles are approaching the vehicle in a manner that is likely to cause a collision with the vehicle backing up if the vehicle and the approaching vehicles and/or pedestrians were to continue in their present or projected trajectories.

In another exemplary embodiment (corresponding to an exemplary embodiment of FIG. 4), the rear camera images are displayed in a rear parking assist mode if the vehicle is in reverse and at least one of a plurality of additional conditions (such as whether a speed of the vehicle is greater than or equal to a first predetermined threshold, whether a distance traveled by the vehicle is greater than or equal to a second predetermined threshold, whether an amount of time that the vehicle has been moving is greater than or equal to a third predetermined threshold, or whether an amount of time that the vehicle has been in the reverse driving mode is greater than or equal to a fourth predetermined threshold) are satisfied. Similarly, also in this other exemplary embodiment, the rear camera images are displayed in a rear cross traffic view mode if the vehicle is in a reverse driving mode and none of these plurality of additional conditions are satisfied.

It will be appreciated that the disclosed method and systems may vary from those depicted in the Figures and described herein. For example, as mentioned above, the control system 100 of FIG. 1 may be disposed in whole or in part in any one or more of a number of different vehicle units, devices, and/or systems. In addition, it will be appreciated that certain steps of the process 200 and/or the second process 400 may vary from those depicted in FIGS. 2 and 4 and/or described herein in connection therewith. It will similarly be appreciated that certain steps of the process 200 and/or the second process 400 may occur simultaneously or in a different order than that depicted in FIGS. 2 and 4 and/or described herein in connection therewith. It will similarly be appreciated that the disclosed methods and systems may be implemented and/or utilized in connection with various different types of automobiles, sedans, sport utility vehicles, trucks, and/or any of a number of other different types of vehicles, and in controlling any one or more of a number of different types of vehicle infotainment systems.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for displaying images of a camera associated with a vehicle that is controlled/processed by a processor, the method comprising the steps of:
    receiving data from one or more sensors of the vehicle;
    displaying the images in a first mode if a first condition is satisfied, the first condition being satisfied based on an indication from the data as to an object in proximity to the vehicle; and
    displaying the images in a second mode if a second condition is satisfied, the second condition being satisfied based on the indication from the data as to the object in proximity to the vehicle.

2. The method of claim 1, further comprising the step of:
    determining whether the vehicle is in a reverse driving mode, wherein:
    the step of displaying the images in the first mode comprises the step of displaying the images in the first mode provided that the first condition is satisfied and provided further that the vehicle is in the reverse driving mode; and
    the step of displaying the images in the second mode comprises the step of displaying the images in the second mode provided that the second condition is satisfied and provided further that the vehicle is in the reverse driving mode.

3. The method of claim 1, further comprising the step of:
    receiving a driver request for display of the images, wherein:

the step of displaying the images in the first mode comprises the step of displaying the images in the first mode if the driver request is to display the images in the first mode; and the step of displaying the images in the second mode comprises the step of displaying the images in the second mode if the driver request is to display the images in the second mode.

4. The method of claim 1, wherein:

the step of displaying the images in the first mode comprises the step of displaying the images with a first field of view behind the vehicle; and the step of displaying the images in the second mode comprises the step of displaying the images with a second field of view behind the vehicle, the second field of view being greater than the first field of view.

5. The method of claim 4, wherein:

the step of displaying the images in the first mode comprises the step of displaying the images in the first mode if the data indicates that the object is in a first region proximate the vehicle; and the step of displaying the images in the second mode comprises the step of displaying the images in the second mode if the data indicates that the object is in a second region proximate the vehicle.

6. The method of claim 5, wherein:

the step of displaying the images in the first mode comprises the step of displaying the images in the first mode if the data indicates that an obstacle is in the first region, the first region being substantially directly behind the vehicle; and the step of displaying the images in the second mode comprises the step of displaying the images in the second mode if the data indicates that one or more approaching vehicles, pedestrians, or both are approaching the vehicle from the second region, the second region being to the right or the left of the vehicle.

7. The method of claim 6, further comprising the steps of:

calculating an estimated time to collision from the one or more approaching vehicles, pedestrians, or both; and providing a warning if the estimated time to collision is less than a predetermined threshold.

8. The method of claim 7, further comprising the step of:

displaying the images in the second mode only on the further condition that the estimated time to collision is less than the predetermined threshold.

9. A method for displaying images of a camera associated with a vehicle that is controlled/processed by a processor, the method comprising the steps of:

receiving data from one or more sensors of the vehicle, determining whether the vehicle is in a reverse driving mode;

displaying the images with a first field of view if a first condition is satisfied and further provided that the vehicle is in the reverse driving mode, the first condition being satisfied based on an indication from the data as to an object in proximity to the vehicle; and displaying the images with a second field of view greater than the first field of view, if a second condition is satisfied and further provided that the vehicle is in the reverse driving mode, the second condition being satisfied based on the indication from the data as to the object in proximity to the vehicle.

10. The method of claim 9, further comprising the step of:
receiving a driver request for display of the images, wherein:

the step of displaying the images with the first field of view comprises the step of displaying the images with the first field of view if the driver request is to display the images with the first field of view and further provided that the vehicle is in the reverse driving mode; and the step of displaying the images with the second field of view comprises the step of displaying the images with the second field of view if the driver request is to display the images with the second field of view and further provided that the vehicle is in the reverse driving mode.

11. The method of claim 9, wherein:

the step of displaying the images with the first field of view comprises the step of displaying the images with the first field of view if the data indicates that the object is in a first region proximate the vehicle and further provided that the vehicle is in the reverse driving mode; and the step of displaying the images with the second field of view comprises the step of displaying the images with the second field of view if the data indicates that the object is in a second region proximate the vehicle and further provided that the vehicle is in the reverse driving mode.

12. The method of claim 11, wherein:

the step of displaying the images with the first field of view comprises the step of displaying the images with the first field of view if the data indicates that an obstacle is in the first region, the first region being substantially directly behind the vehicle; and the step of displaying the images with the second field of view comprises the step of displaying the images with the second field of view if one or more approaching vehicles, pedestrians, or both, are approaching the vehicle from the second region, the second region being to the right or the left of the vehicle.

13. The method of claim 9, wherein:

the second condition is satisfied if one or more of a plurality of additional conditions are satisfied; and the first condition is satisfied if none of the plurality of additional conditions are satisfied.

14. The method of claim 13, wherein the plurality of additional conditions are selected from the group consisting of: whether an object is detected behind the vehicle, whether a speed of the vehicle is greater than or equal to a first predetermined threshold, whether a distance travelled by the vehicle is greater than or equal to a second predetermined threshold, whether an amount of time that the vehicle has been moving is greater than or equal to a third predetermined threshold, and whether an amount of time that the vehicle has been in the reverse driving mode is greater than or equal to a fourth predetermined threshold.

15. A system for displaying images of a camera associated with a vehicle, the system comprising:

one or more first sensors configured to detect whether an object is in a first region proximate the vehicle;

one or more second sensors configured to detect whether the object is in a second region proximate the vehicle; and a processor coupled to the one or more first sensors and the one or more second sensors and configured to facilitate:

displaying the images with a first field of view if the object is in the first region; and displaying the images with a second field of view if the object is in the second region, the second field of view being greater than the first field of view.

16. The system of claim 15, wherein the processor is configured to facilitate displaying the images:

with the first field of view if an obstacle is detected in the first region, the first region being substantially directly behind the vehicle; and with the second field of view if one or more approaching vehicles, pedestrians, or both, are approaching the vehicle from the second region, the second region being to the right or the left of the vehicle.

17. The system of claim 16, wherein the processor is further configured to:

determine whether the vehicle is in a reverse driving mode; and facilitate displaying the images:

with the first field of view if the obstacle is detected in the first region and further provided that the vehicle is in the reverse driving mode; and with the second field of view if the one or more approaching vehicles, pedestrians, or both, are approaching the vehicle from the second region and further provided that the vehicle is in the reverse driving mode.

18. The system of claim 17, further comprising:

an interface configured to receive a driver request for display of the images;

wherein the processor is coupled to the interface and is further configured to facilitate:

displaying the images with the first field of view if the driver request is to display the images with the first field of view and further provided that the vehicle is in the reverse driving mode; and displaying the images with the second field of view if the driver request is to display the images with the second field of view and further provided that the vehicle is in the reverse driving mode.

19. The system of claim 17, wherein the processor is further configured to calculate an estimated time to collision from the one or more approaching vehicles, pedestrians, or both, and the system further comprises:

a warning indicator coupled to the processor and configured to provide a warning if the estimated time to collision is less than a predetermined threshold.

20. The system of claim 19, wherein the processor is further configured to facilitate displaying the images with the second field of view only on the further condition that the estimated time to collision is less than the predetermined threshold.

* * * * *